(12) United States Patent
Yang

(10) Patent No.: US 10,033,807 B2
(45) Date of Patent: Jul. 24, 2018

(54) METHOD AND M2M GATEWAY FOR MANAGING DATA OF TERMINAL PERIPHERAL

(71) Applicant: ZTE Corporation, Shenzhen, Guangdong (CN)

(72) Inventor: Kun Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 153 days.

(21) Appl. No.: 14/437,891

(22) PCT Filed: Jul. 29, 2013

(86) PCT No.: PCT/CN2013/080368
§ 371 (c)(1),
(2) Date: Apr. 23, 2015

(87) PCT Pub. No.: WO2013/178181
PCT Pub. Date: Dec. 5, 2013

(65) Prior Publication Data
US 2015/0296009 A1 Oct. 15, 2015

(30) Foreign Application Priority Data
Oct. 26, 2012 (CN) .......................... 2012 1 0417404

(51) Int. Cl.
*G06F 15/16* (2006.01)
*H04L 29/08* (2006.01)
(Continued)

(52) U.S. Cl.
CPC ........ *H04L 67/1044* (2013.01); *H04L 67/104* (2013.01); *H04L 67/12* (2013.01);
(Continued)

(58) Field of Classification Search
CPC ...................................................... H04L 29/08
(Continued)

(56) References Cited

U.S. PATENT DOCUMENTS 6,170,013 B1 * 1/2001 Murata ............ G06F 17/30902
707/E17.12
6,523,044 B1 * 2/2003 Muramoto ........ G06F 17/30312
(Continued)

FOREIGN PATENT DOCUMENTS

CN 101695440 A 4/2010
CN 102045896 A 5/2011
(Continued)

OTHER PUBLICATIONS

Supplementary European Search Report in European application No. 13796704.8, dated Nov. 24, 2015.
(Continued)

*Primary Examiner* — Anthony Mejia
(74) *Attorney, Agent, or Firm* — Oppedahl Patent Law Firm LLC

(57) ABSTRACT

Disclosed is a method for managing data of a terminal peripheral, the method includes: a Machine to Machine/Man (M2M) gateway collects, stores, processes and forwards data of the terminal peripheral and/or a group of terminal peripherals according to a strategy; wherein the strategy is issued by an M2M application or an M2M service platform or is configured locally at the M2M gateway; the strategy includes at least a data collection strategy, a data storage strategy, a data processing strategy and a data forward strategy. Further disclosed is an M2M gateway for managing data of a terminal peripheral, configured to collect, store, process and forward data of the terminal peripheral and/or a group of terminal peripherals according to a strategy. By means of embodiments of the disclosure, managerial func-
(Continued)

tions of the M2M gateway are perfected, thereby performing efficient management of data of the terminal peripheral.

17 Claims, 2 Drawing Sheets

(51) Int. Cl.
  *H04W 8/22* (2009.01)
  *H04W 4/70* (2018.01)
  *H04W 88/16* (2009.01)

(52) U.S. Cl.
  CPC ............ *H04W 4/70* (2018.02); *H04W 8/22* (2013.01); *H04W 88/16* (2013.01)

(58) Field of Classification Search
  USPC ........................................................ 709/224
  See application file for complete search history.

(56) References Cited

U.S. PATENT DOCUMENTS

| | | | | |
|---|---|---|---|---|
| 8,272,061 B1* | 9/2012 | Lotem | ................ | G06F 21/577 709/223 |
| 2003/0158924 A1* | 8/2003 | DeLegge | ............ | H04L 41/5009 709/223 |
| 2004/0010327 A1* | 1/2004 | Terashima | ............ | G05B 15/02 700/83 |
| 2004/0015425 A1* | 1/2004 | O'Neill | ................ | G06Q 20/10 705/35 |
| 2004/0039906 A1* | 2/2004 | Oka | ................ | H04L 63/065 713/156 |
| 2004/0044727 A1* | 3/2004 | Abdelaziz | .......... | H04L 61/3065 709/203 |
| 2005/0021715 A1* | 1/2005 | Dugatkin | ................ | H04L 43/12 709/223 |
| 2005/0165899 A1* | 7/2005 | Mazzola | ............. | H04L 12/2803 709/217 |
| 2006/0133414 A1* | 6/2006 | Luoma | ................. | H04W 88/16 370/466 |
| 2006/0168178 A1* | 7/2006 | Hwang | ............... | H04L 12/2803 709/223 |
| 2008/0016206 A1* | 1/2008 | Ma | ...................... | H04L 43/0817 709/224 |
| 2008/0064395 A1* | 3/2008 | Sibileau | ................. | G08C 17/02 455/433 |
| 2008/0208868 A1* | 8/2008 | Hubbard | ........... | G06F 17/30867 |
| 2009/0168678 A1* | 7/2009 | Han | ................... | H04W 52/0225 370/311 |
| 2009/0187654 A1* | 7/2009 | Raja | .................... | H04L 63/0272 709/224 |
| 2009/0327059 A1* | 12/2009 | Grigorovitch | .......... | G06F 21/10 705/14.15 |
| 2010/0061364 A1* | 3/2010 | Damola | ............. | H04L 12/2834 370/352 |
| 2010/0150342 A1* | 6/2010 | Richards | ............... | H04L 9/0822 380/30 |
| 2010/0222053 A1* | 9/2010 | GiriSrinivasaRao | . | H04W 24/08 455/432.1 |
| 2010/0257264 A1* | 10/2010 | Assadzadeh | ............ | H04L 29/06 709/223 |
| 2010/0283782 A1* | 11/2010 | He | .......................... | G01C 23/00 345/420 |
| 2010/0286937 A1* | 11/2010 | Hedley | .................. | G06Q 30/02 702/60 |
| 2010/0322141 A1* | 12/2010 | Liu | ........................ | H04W 24/10 370/315 |
| 2011/0040785 A1* | 2/2011 | Steenberg | .......... | G05B 23/0235 707/769 |
| 2011/0098832 A1* | 4/2011 | Zhang | ................. | H04L 12/2818 700/90 |
| 2011/0142061 A1* | 6/2011 | Wang | .................. | H04L 12/2834 370/401 |
| 2011/0201267 A1* | 8/2011 | Synnergren | ............. | H04W 4/00 455/3.01 |
| 2011/0213871 A1* | 9/2011 | DiGirolamo | ............ | H04W 4/00 709/223 |
| 2011/0288874 A1* | 11/2011 | Hinkamp | ............ | G06F 21/6245 705/1.1 |
| 2011/0299492 A1* | 12/2011 | Lee | ......................... | H04W 4/00 370/329 |
| 2012/0047551 A1* | 2/2012 | Pattar | ...................... | H04W 4/00 726/1 |
| 2012/0084412 A1* | 4/2012 | Burns | ................. | H04L 41/0893 709/221 |
| 2012/0086581 A1* | 4/2012 | Marsell | .................... | H04Q 9/00 340/870.02 |
| 2012/0113992 A1* | 5/2012 | Zhao | ..................... | H04W 4/005 370/431 |
| 2012/0151058 A1* | 6/2012 | Lee | ...................... | H04L 12/2834 709/225 |
| 2012/0231828 A1* | 9/2012 | Wang | ...................... | H04W 4/70 455/509 |
| 2012/0271765 A1* | 10/2012 | Cervenka | ................ | G06Q 20/12 705/44 |
| 2013/0003609 A1* | 1/2013 | Ballot | ..................... | H04W 4/70 370/259 |
| 2013/0003655 A1* | 1/2013 | Dietz | .................. | H04L 65/1016 370/328 |
| 2013/0041997 A1* | 2/2013 | Li | ......................... | H04W 4/005 709/223 |

FOREIGN PATENT DOCUMENTS

| | | |
|---|---|---|
| CN | 102487487 A | 6/2012 |
| EP | 2466791 A1 | 6/2012 |
| WO | 2011109424 A1 | 9/2011 |

OTHER PUBLICATIONS

International Search Report in international application No. PCT/CN2013/080368, dated Oct. 31, 2013.
English Translation of the Written Opinion of the International Search Authority in international application No. PCT/CN2013/080368, dated Oct. 31, 2013.

* cited by examiner

METHOD AND M2M GATEWAY FOR MANAGING DATA OF TERMINAL PERIPHERAL

TECHNICAL FIELD

The disclosure relates to techniques for managing a terminal peripheral in Machine to Machine/Man (M2M) communications, and in particular to a method and an M2M gateway for managing data of a terminal peripheral.

BACKGROUND

Architecture of an M2M system is divided into an M2M application layer, an M2M service capability layer, a communication network layer, an M2M terminal and perception extension layer, and a management supporting system.

According to capabilities of M2M terminal devices, the M2M terminal and perception extension layer divides the M2M terminal devices into two categories: one is an M2M terminal having a capability of communicating with an M2M communication network, which can directly access to an M2M service platform through the communication network, interact with the platform to implement registration, authentication and authorization of the terminal, provide perceptual information desired by an application, perform service interaction with the application through the M2M service platform, and receive management information for terminal peripherals; and the other is an M2M gateway having a capability of communicating with a M2M communication network and an M2M stub network, which can, besides accessing the M2M stub network and a perception device into a network, receive management information for nodes of the M2M stub network and perform protocol conversion between the M2M stub network and the M2M communication network. The terminal peripherals are terminals such as sensors for performing environment perception and data collection, they have limited resources such as processing capabilities, storage capabilities and power supplies, thus can only perform short-distance communications; such an individual terminal is referred to as a terminal peripheral, and a network consisting of multiple nodes of such terminals is referred to as an M2M stub network.

The M2M stub network consists of nodes having capabilities of information collection, simple processing and communication, such as sensors, and the M2M stub network is adapted to collaboratively sense and collect relevant information of a monitored object within a network coverage, and transmit monitored data to an M2M gateway which in turn will transmit, through a communication network, the sensed data to an M2M service platform or application for processing and analysis.

The terminal peripherals refer to individual devices having an environment perception functionality, such as sensors, and the terminal peripherals can transmit, through an M2M gateway or M2M terminal, sensed information to an M2M service platform, and can also receive downlink information regarding management of the terminal peripheral per se from an M2M application or M2M service platform.

The problem of the prior art lies in that: due to their limited processing capability, storage capability and power supply, an M2M stub network and a terminal peripheral cannot directly communicate with a communication network, and they can access the communication network through an M2M gateway; an existing M2M gateway can perform protocol conversion between an M2M network and an upper layer network, can converge and forward data information collected by the M2M stub network and the terminal peripheral, and can also receive control information from functional modules of an M2M service platform or the M2M gateway per se and manage the M2M stub network and the terminal peripheral. However, an existing management functionality implemented based on an M2M gateway is not perfect, thus it cannot perform efficient management of data of the terminal peripheral, and cannot provide effective support to functionalities of a network (M2M application or M2M service platform) or the M2M gateway per se. There is an urgent need for refining and perfecting managerial functions of the M2M gateway so as to perform efficient management of data of the terminal peripheral.

SUMMARY

In view of the above, embodiments of the disclosure are intended to provide a method and an M2M gateway for managing data of a terminal peripheral, which can perfect managerial functions of the M2M gateway, thereby performing efficient management of data of the terminal peripheral and providing effective support to functionalities of a network or the M2M gateway per se.

To this end, the technical solutions of embodiments of the disclosure are implemented as follows.

A method for managing data of a terminal peripheral, including: a Machine to Machine/Man (M2M) gateway collects, stores, processes and forwards data of the terminal peripheral and/or a group of terminal peripherals according to a strategy;

wherein the strategy is issued by an M2M application or an M2M service platform or is configured locally at the M2M gateway; the strategy includes at least a data collection strategy, a data storage strategy, a data processing strategy and a data forward strategy.

In an embodiment, the step that the M2M gateway collects data may include: upon receiving data transmitted by the terminal peripheral and/or the group of terminal peripheral, the M2M gateway screens received data according to the data collection strategy, or acquires data from different functional modules of the M2M gateway according to the data collection strategy.

In an embodiment, the step that the M2M gateway stores data may include: the M2M gateway stores, according to the data storage strategy, collected data in a specified storage manner including storage by category.

In an embodiment, the step that the M2M gateway processes data may include: the M2M gateway performs, on the data, at least one operation of retrieval, data query, data modification, data deletion and data backup.

In an embodiment, the step that the M2M gateway performs retrieval on the data may include: the M2M gateway performs ranked retrieval on data stored by category according to the data processing strategy.

In an embodiment, the step that the M2M gateway forwards data may include: the M2M gateway forwards, according to the data forward strategy, data from the ranked retrieval to a network and/or different functional modules of the M2M gateway.

An M2M gateway for managing data of a terminal peripheral, configured to collect, store, process and forward data of the terminal peripheral and/or a group of terminal peripherals according to a strategy;

wherein the strategy is issued by an M2M application or an M2M service platform or is configured locally at the M2M gateway; the strategy includes at least a data collection strategy, a data storage strategy, a data processing strategy and a data forward strategy.

In an embodiment, the M2M gateway may include a data collection unit configured to, upon receiving data transmitted by the terminal peripheral and/or the group of terminal peripheral, screen received data according to the data collection strategy, or acquire data from different functional modules of the M2M gateway according to the data collection strategy.

In an embodiment, the M2M gateway may further include a data storage unit configured to store, according to the data storage strategy, collected data in a specified storage manner including storage by category.

In an embodiment, the M2M gateway may further include a data processing unit configured to perform according to the data processing strategy, on the data, at least one operation of retrieval, data query, data modification, data deletion and data backup.

In an embodiment, the M2M gateway may further include a data forward unit configured to forward, according to the data forward strategy, data from the ranked retrieval to a network and/or different functional modules of the M2M gateway.

The M2M gateway according to embodiments of the disclosure collects, stores, processes and forwards data of the terminal peripheral and/or a group of terminal peripherals according to a strategy; wherein the strategy is issued by an M2M application or an M2M service platform or is configured locally at the M2M gateway; the strategy includes at least a data collection strategy, a data storage strategy, a data processing strategy and a data forward strategy.

By means of embodiments of the disclosure, based on an M2M gateway and relevant strategies, multiple managerial operations such as data collection, data storage, data processing and data forward can be performed on data of a terminal peripheral and/or a group of terminal peripherals, thus managerial functions of the M2M gateway are perfected, thereby performing efficient management of data of the terminal peripheral and providing effective support to functionalities of a network or the M2M gateway per se.

DETAILED DESCRIPTION

Figure 1:
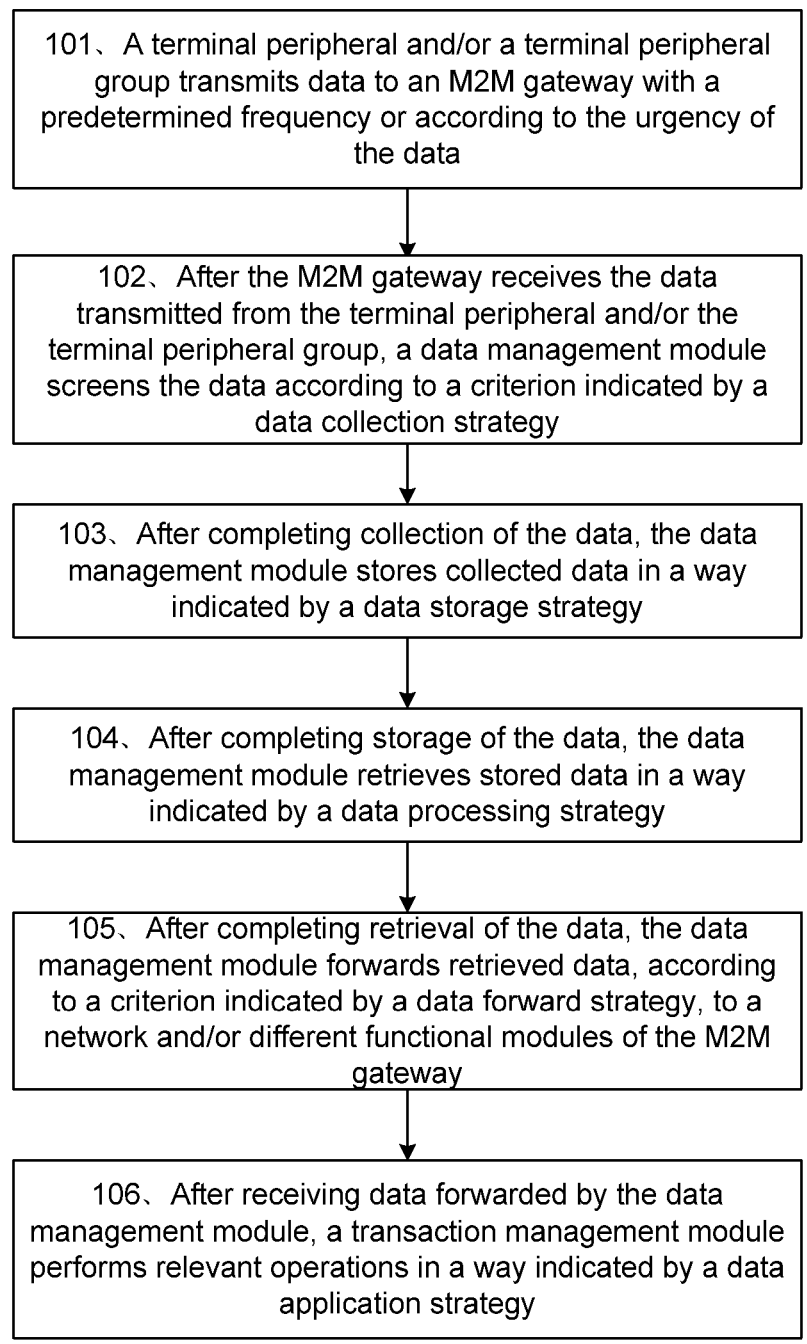
FIG. 1 is a flow chart for implementing a first embodiment of the method according to the disclosure.

In embodiments of the disclosure, an M2M gateway collects, stores, processes and forwards data of the terminal peripheral and/or a group of terminal peripherals according to a strategy; wherein the strategy is issued by an M2M application or an M2M service platform or is configured locally at the M2M gateway; the strategy includes at least a data collection strategy, a data storage strategy, a data processing strategy and a data forward strategy.

In the prior art, there is no mechanism for implementing efficient management of data of a terminal peripheral through an M2M gateway. However, the method and the M2M gateway for managing data of a terminal peripheral provided by embodiments of the disclosure can implement a series of management including retrieval, storage, processing and forward of data of the terminal peripheral, thereby implementing application of the data.

Embodiment of the disclosure may mainly include the following content.

The M2M gateway (data management module) can collects, stores, processes and forwards data of the terminal peripheral and/or a group of terminal peripherals according to a strategy. The strategy may be issued by an M2M application or an M2M service platform or may also be configured locally at the M2M gateway; the strategy may include a data collection strategy, a data storage strategy, a data processing strategy and a data forward strategy.

Preferably, the step of collecting data may include: data received by the M2M gateway are screened, or data are acquired from different functional modules of the M2M gateway, according to the data collection strategy.

Preferably, the step of storing data may include: collected data are stored according to the data storage strategy.

Preferably, the step of processing data may include: perform according to the data processing strategy, on stored data, at least one operation of retrieval, data query, data modification, data deletion and data backup.

Preferably, the step of forwarding data may include: retrieved data are forwarded, according to the data forward strategy, to a network and/or different functional modules of the M2M gateway, such as a transaction management module, a remote management module and the like.

The above are basic description of inventive points of the disclosure and involved modules, detailed description is as follows.

1. as to data collection, the terminal peripheral and/or terminal peripheral group transmits data to the M2M gateway; the data may be monitored data (temperature, humidity or luminance) of the terminal peripheral and/or the terminal peripheral group; and the data may also be information data (node information, state information or capability information) of the terminal peripheral and/or the terminal peripheral group.

After the M2M gateway receives the data transmitted from the terminal peripheral and/or the terminal peripheral group, the data are screened (by a data management module) according to a (data collection) strategy.

Or, the M2M gateway (data management module) acquires, from different functional modules in the M2M gateway, service data (i.e., statistical data, accounting data or multimedia data) according to a (data collection) strategy.

The (data collection) strategy includes criteria for the M2M gateway to screen data of the terminal peripheral and/or terminal peripheral group and to acquire data of different functional modules in the M2M gateway.

2. As to the data storage, after completing collection of the data, the M2M gateway (data management module) stores collected data according to a (data storage) strategy.

The (data storage) strategy refers to a way in which the M2M gateway stores the collected data, such as storage by category.

3. As to the data processing, after completing storage of the data, the M2M gateway (data management module) retrieves stored data according to a (data processing) strategy.

The (data processing) strategy refers to a way in which the M2M gateway retrieves the stored data, such as ranked retrieval; and it also includes method for the M2M gateway to query, modify, delete and back up the stored data.

4. As to the data forward, after completing retrieval of the data, the M2M gateway (data management module) forwards retrieved data, according to a (data forward) strategy, to a network and/or different functional modules of the M2M gateway.

The (data forward) strategy includes a basis on which the M2M gateway forwards the retrieved data to a network and/or different functional modules in the M2M gateway.

5. After receiving data forwarded (by the data management module), a network and/or different functional modules in the M2M gateway performs relevant operations according to a (data application) strategy.

The (data application) strategy includes a way in which a network and/or different functional modules in the M2M gateway uses data forwarded by the M2M gateway (data management module), such as setting trigger threshold of a service.

Implementation of technical solutions will be further elaborated below with reference to the drawings.

Embodiment 1, data acquired by an M2M gateway may include data acquired from external terminal peripherals and/or a terminal peripheral group, and the M2M gateway interacts with its internal functional modules (i.e., transaction module) to perform data management. As shown in FIG. 1, the embodiment includes the following steps:

step 101, a terminal peripheral and/or a terminal peripheral group transmits data to an M2M gateway with a predetermined frequency or according to the urgency of the data.

Specifically, the data may be monitored data of the terminal peripheral and/or the terminal peripheral group, such as temperature, humidity or luminance; and the data may also be information data of the terminal peripheral and/or the terminal peripheral group, such as node information, state information or capability information.

Step 102, after the M2M gateway receives the data transmitted from the terminal peripheral and/or the terminal peripheral group, a data management module screens the data according to a criterion indicated by a data collection strategy.

Specifically, it can be implemented by establishing a data screening list in stored data of the data management module so as to indicate data of the terminal peripheral and/or the terminal peripheral group, which are desired to be collected by the data management module, and as shown in Table 1, content included in the list may be as follows.

TABLE 1

| Identifier of terminal peripheral/terminal peripheral group | Data | | | | |
|---|---|---|---|---|---|
| Terminal peripheral #N | Monitored data A | ... | Information data C | ... | |
| ... | ... | ... | ... | ... | |
| Terminal peripheral #N | Monitored data B | ... | Information data D | ... | |
| ... | ... | ... | ... | ... | |

Step 103, after completing collection of the data, the data management module stores collected data in a way indicated by a data storage strategy.

Specifically, it can be implemented by establishing a data storage list in stored data of the data management module so as to indicate the type of data to be stored by the data management module, and as shown in Table 2, content included in the list may be as follows.

TABLE 2

| | Type I | Type II | ... |
|---|---|---|---|
| Monitored data | Monitored data A Monitored data C | Monitored data B Monitored data D | ... ... |
| | ... | ... | ... |
| Information data | Information data A Information data B | Information data C Information data D | ... ... |
| | ... | ... | ... |
| Service data | Service data A Service data C | Service data B Service data D | ... ... |
| | ... | ... | ... |
| ... | ... | ... | ... |

Table 2

Step 104, after completing storage of the data, the data management module retrieves stored data in a way indicated by a data processing strategy.

Specifically, it can be implemented by establishing a data priority list in stored data of the data management module so as to indicate the rank of data stored by the data management module, and as shown in Table 3, content included in the list may be as follows.

TABLE 3

| Data priority | Data category | | | |
|---|---|---|---|---|
| Rank 1 | Monitored data/Type I, II | Information data/Type I | Service data/Type I, II | ... |
| Rank 2 | Monitored data/Type III | Information data/Type II, III | Service data/Type II | ... |
| ... | ... | ... | ... | ... |

The data management module then set retrieval frequencies of data according to priorities of the data indicated in the data priority list, i.e., data having a higher rank may be set with a higher retrieval frequency while data having a lower rank may be set with a lower retrieval frequency, as shown in Table 4.

TABLE 4

| Data priority | Retrieval frequency (time interval) |
|---|---|
| Rank 1 | 0 second (uninterrupted) |
| Rank 2 | 30 seconds |
| ... | ... |

Step 105, after completing retrieval of the data, the data management module forwards retrieved data, according to a criterion indicated by a data forward strategy, to a network and/or different functional modules of the M2M gateway.

Specifically, it can be implemented by establishing a data forward list in stored data of the data management module so as to indicate a destination to be forwarded of data retrieved by the data management module, and as shown in Table 5, content included in the list may be as follows.

TABLE 5

| Destination to be forwarded | | Content to be forwarded |
|---|---|---|
| Network | M2M service platform | Monitored data A, Information data B |
| | M2M application | Service data C |
| | ... | ... |

TABLE 5-continued

| | Destination to be forwarded | Content to be forwarded |
|---|---|---|
| Local | Transaction management module | Monitored data D |
| | Remote management module | Information data |
| | . . . | . . . |

Step 106, after receiving data forwarded by the data management module, a transaction management module performs relevant operations in a way indicated by a data application strategy.

Specifically, it can be implemented by establishing a controlling service list in stored data of the transaction management module so as to indicate a service trigger threshold of the transaction management module, and as shown in Table 6, content included in the list may be as follows.

TABLE 6

| Controlling service | Service trigger condition | |
|---|---|---|
| Service #1 | Monitored data A | Threshold 1 |
| | Information data B | Threshold 2 |
| Service #2 | Service data C | Threshold 3 |
| . . . | . . . | |

When detecting, according to the service trigger threshold in the controlling service list, that data forwarded by the data management module meet a service trigger condition of the transaction management module, the transaction management module performs an operation related to the controlling service.

Figure 2:
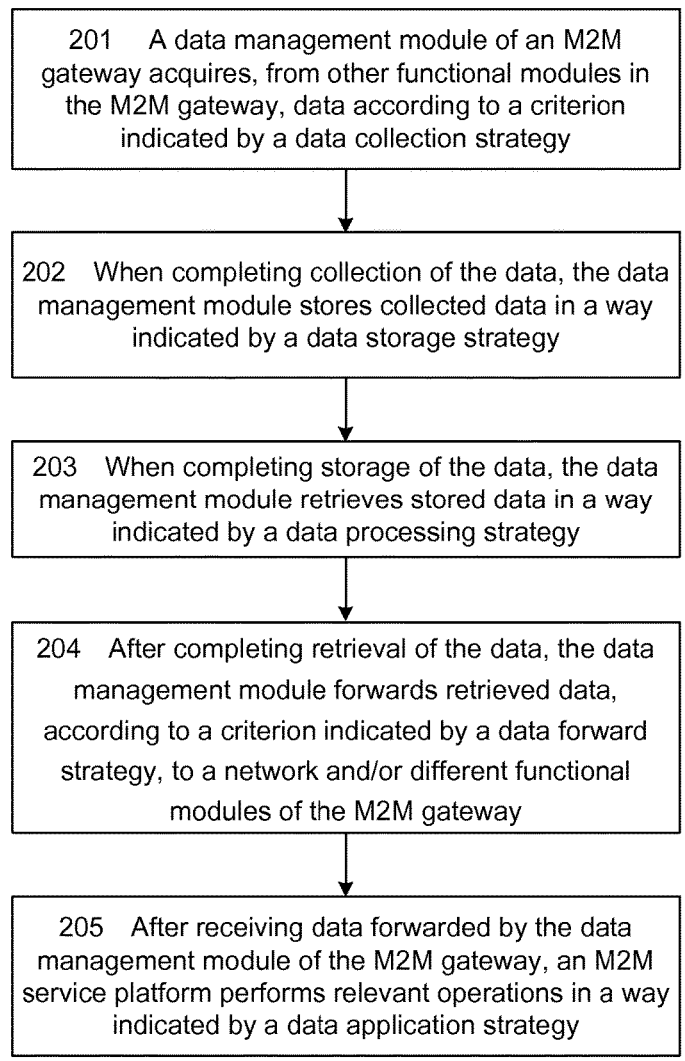
FIG. 2 is a flow chart for implementing a second embodiment of the method according to the disclosure.

Embodiment 1, data acquired by an M2M gateway may include data generated by the M2M gateway per se, and the M2M gateway interacts with external functional modules to perform data management. As shown in FIG. 2, the embodiment includes the following steps:

step 201, a data management module of an M2M gateway acquires, from other functional modules in the M2M gateway, data according to a criterion indicated by a data collection strategy.

Here, the data may be service data of different functional modules in the M2M gateway, such as statistical data, accounting data or multimedia data.

Specifically, it can be implemented by establishing a data collection list in stored data of the data management module so as to indicate data of the other functional modules in the M2M gateway, which are desired to be collected by the data management module, and as shown in Table 7, content included in the list may be as follows.

TABLE 7

| Functional module | Data | |
|---|---|---|
| Transaction management module | Service data A | . . . |
| Remote management module | Service data B | . . . |
| . . . | . . . | . . . |

Step 202, when completing collection of the data, the data management module stores collected data in a way indicated by a data storage strategy.

Specifically, it can be implemented by establishing a data storage list in stored data of the data management module so as to indicate, to the data management module, the type of data to be stored, as shown in above Table 2.

Step 203, when completing storage of the data, the data management module retrieves stored data in a way indicated by a data processing strategy.

Specifically, it can be implemented by establishing a data priority list in stored data of the data management module so as to indicate the rank of data stored by the data management module, as shown in above Table 3.

The data management module then set retrieval frequencies of data according to priorities of the data indicated in the data priority list, i.e., data having a higher rank may be set with a higher retrieval frequency while data having a lower rank may be set with a lower retrieval frequency, as shown in above Table 4.

Step 204, after completing retrieval of the data, the data management module forwards retrieved data, according to a criterion indicated by a data forward strategy, to a network and/or different functional modules of the M2M gateway.

Specifically, it can be implemented by establishing a data forward list in stored data of the data management module so as to indicate a destination to be forwarded of data retrieved by the data management module, as shown in above Table 5.

Step 205, after receiving data forwarded by the data management module of the M2M gateway, an M2M service platform performs relevant operations in a way indicated by a data application strategy.

Specifically, in implementation, the service platform can determine, through a service logic, data triggered to different functional modules in the service platform for service processing, then transmit original data or processed data to an M2M application or a terminal peripheral and/or a terminal peripheral group.

Figure 3:
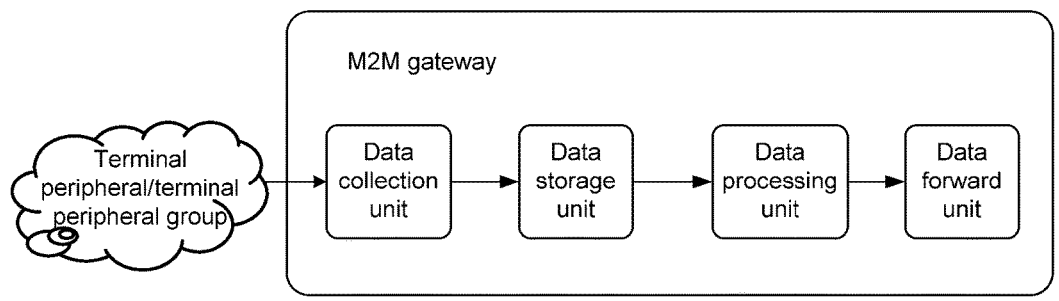
FIG. 3 is a schematic diagram showing interaction between a gateway and a terminal peripheral according to an embodiment of the disclosure.

As shown in FIG. 3, when the M2M gateway for managing data of a terminal peripheral according to the embodiment interacts with the terminal peripheral and/or a terminal peripheral group, it acquires data from the terminal peripheral and/or the terminal peripheral group, and can perform, in sequence, data collection after data screening, data storage including storage by category, data processing including ranked retrieval, data forward and the like. The M2M gateway may include a data collection unit, a data storage unit, a data processing unit and a data forward unit. In an embodiment, the data collection unit may be configured to, upon receiving data transmitted by the terminal peripheral and/or the group of terminal peripheral, screen received data according to the data collection strategy, or acquire data from different functional modules of the M2M gateway according to the data collection strategy. The data storage unit may be configured to store, according to the data storage strategy, collected data in a specified storage manner including storage by category. The data processing unit may be configured to perform according to the data processing strategy, on the data, at least one operation of retrieval, data query, data modification, data deletion and data backup. The data forward unit may be configured to forward, according to the data forward strategy, data from the ranked retrieval to a network and/or different functional modules of the M2M gateway.

What described are merely preferable embodiments of the disclosure, and are not intended to limit the scope of protection of the disclosure.

INDUSTRIAL APPLICABILITY

Based on the M2M gateway and relevant strategies, embodiments of the disclosure can perform multiple managerial operations on data of the terminal peripheral and/or a group of terminal peripherals, such as data collection, data storage, data processing and data forward. By means of embodiments of the disclosure, managerial functions of the M2M gateway are perfected, thereby performing efficient management of data of the terminal peripheral and providing effective support to functionalities of a network or the M2M gateway per se.

The invention claimed is:

1. A method for managing data of a terminal peripheral, comprising: collecting, storing, processing and forwarding, by a Machine to Machine/Man (M2M) gateway, data of the terminal peripheral and/or a group of terminal speripherals according to strategies by establishing lists in stored data of the M2M gateway;
wherein the strategies are issued by an M2M application or an M2M service platform or is configured locally at the M2M gateway, and include at least a data collection strategy, a data storage strategy, a data processing strategy and a data forward strategy;
wherein the lists include at least a data screening list, a data collection list, a data storage list, a data priority list, and a data forward list, and the data screening list indicates data of the terminal peripheral and/or the group of terminal peripheral, which are desired to be collected by the M2M gateway, the data collection list indicates data to be collected by the M2M gateway, the data storage list indicates a type of data to be stored by the M2M gateway, the data priority list indicates a rank of data stored by the M2M gateway, and the data forward list indicates a destination to be forwarded of data retrieved by the M2M gateway;
wherein the method further comprises:
upon receiving the data forwarded, when detecting that the data meet a service trigger condition according to a service trigger threshold, performing, by the M2M gateway, an operation related to the controlling service according to a data application strategy by establishing a controlling service list to perform efficient management of data of the terminal peripheral and/or the group of terminal peripherals, wherein the controlling service list indicates the service trigger threshold of the M2M gateway;
wherein the processing the data comprises:
setting, by the M2M gateway, retrieval frequencies of data according to priorities of the data indicated in the data priority list to retrieve the data, the data having a higher rank being set with a higher retrieval frequency and the data having a lower rank being set with a lower retrieval frequency.

2. The method according to claim 1, wherein the collecting data comprises: upon receiving data transmitted by the terminal peripheral and/or the group of terminal peripheral, screening, by the M2M gateway, the received data according to the data collection strategy by establishing the data screening list in the stored data of the M2M gateway, or acquiring data from different functional modules of the M2M gateway according to the data collection strategy by establishing the data screening list in the stored data of the M2M gateway.

3. The method according to claim 1, wherein the storing data comprises: storing, according to the data storage strategy by establishing the data storage list in the stored data of the M2M gateway, data collected by the M2M gateway in a specified storage manner including storage by category.

4. The method according to claim 1, wherein the processing data further comprises: performing, on the data, at least one operation of retrieval, data query, data modification, data deletion and data backup.

5. The method according to claim 4, wherein the performing retrieval on the data comprises: performing ranked retrieval, by the M2M gateway according to the data processing strategy by establishing the data priority list in the stored data of the M2M gateway, on data stored by category.

6. The method according to claim 1, wherein the forwarding data comprises: forwarding, by the M2M gateway according to the data forward strategy by establishing the data forward list in the stored data of the M2M gateway, data from the ranked retrieval to a network and/or different functional modules of the M2M gateway.

7. A Machine to Machine/Man (M2M) gateway for managing data of a terminal peripheral, comprising:
a memory storing computer-executable instructions; and
one or more hardware processors executing the computer-executable instructions configured to collect, store, process and forward data of the terminal peripheral and/or a group of terminal peripherals according to strategies by establishing lists in stored data of the M2M gateway;
wherein the strategies are issued by an M2M application or an M2M service platform or is configured locally at the M2M gateway, and include at least a data collection strategy, a data storage strategy, a data processing strategy and a data forward strategy;
wherein the lists include at least a data screening list, a data collection list, a data storage list, a data priority list, and a data forward list, and the data screening list indicates data of the terminal peripheral and/or the group of terminal peripheral, which are desired to be collected by the M2M gateway, the data collection list indicates data to be collected by the M2M gateway, the data storage list indicates a type of data to be stored by the M2M gateway, the data priority list indicates a rank of data stored by the M2M gateway, and the data forward list indicates a destination to be forwarded of data retrieved by the M2M gateway;
wherein the one or more hardware processors are further configured to: upon receiving the data forwarded, when it is detected that the data meet a service trigger condition according to a service trigger threshold, perform an operation related to the controlling service according to a data application strategy by establishing a controlling service list to perform efficient management of data of the terminal peripheral and/or the group of terminal peripherals, wherein the controlling service list indicates the service trigger threshold of the M2M gateway;
wherein the processing the data comprises: setting retrieval frequencies of data according to priorities of the data indicated in the data priority list to retrieve the data, the data having a higher rank being set with a higher retrieval frequency and the data having a lower rank being set with a lower retrieval frequency.

8. The M2M gateway according to claim 7, wherein the one or more hardware processors are further configured to, upon receiving data transmitted by the terminal peripheral and/or the group of terminal peripheral, screen the received data according to the data collection strategy by establishing the data screening list in the stored data of the M2M gateway, or acquire data from different functional modules of the M2M gateway according to the data collection strategy by establishing the data screening list in the stored data of the M2M gateway.

9. The M2M gateway according to claim 7, wherein the one or more hardware processors are further configured to store, according to the data storage strategy by establishing the data storage list in the stored data of the M2M gateway, collected data in a specified storage manner including storage by category.

10. The M2M gateway according to claim 7, wherein the one or more hardware processors are further configured to:
perform according to the data processing strategy, on the data, at least one operation of retrieval, data query, data modification, data deletion and data backup; and
perform ranked retrieval according to the data processing strategy by establishing the data priority list in the stored data of the M2M gateway on data stored by category.

11. The M2M gateway according to claim 7, wherein the one or more hardware processors are further configured to forward, according to the data forward strategy by establishing the data forward list in the stored data of the M2M gateway, data from the ranked retrieval to a network and/or different functional modules of the M2M gateway.

12. The method according to claim 2, wherein the storing data comprises: storing, according to the data storage strategy by establishing the data storage list in the stored data of the M2M gateway, data collected by the M2M gateway in a specified storage manner including storage by category.

13. The method according to claim 2, wherein the processing data further comprises: performing, on the data, at least one operation of retrieval, data query, data modification, data deletion and data backup.

14. The method according to claim 2, wherein the forwarding data comprises: forwarding, by the M2M gateway according to the data forward strategy by establishing the data forward list in the stored data of the M2M gateway, data from the ranked retrieval to a network and/or different functional modules of the M2M gateway.

15. The M2M gateway according to claim 8, wherein the one or more hardware processors are further configured to store, according to the data storage strategy by establishing the data storage list in the stored data of the M2M gateway, collected data in a specified storage manner including storage by category.

16. The M2M gateway according to claim 8, wherein the one or more hardware processors are further configured to:
perform according to the data processing strategy, on the data, at least one operation of retrieval, data query, data modification, data deletion and data backup; and
perform ranked retrieval according to the data processing strategy by establishing the data priority list in the stored data of the M2M gateway on data stored by category.

17. The M2M gateway according to claim 8, wherein the one or more hardware processors are further configured to forward, according to the data forward strategy by establishing the data forward list in the stored data of the M2M gateway, data from the ranked retrieval to a network and/or different functional modules of the M2M gateway.

* * * * *